United States Patent [19]
O'Leary

[11] Patent Number: 5,314,289
[45] Date of Patent: May 24, 1994

[54] VEHICLE CRANE UNIT

[76] Inventor: Robert M. O'Leary, 1419 N. 13th St., Boise, Id. 83702

[21] Appl. No.: 990,279

[22] Filed: Dec. 14, 1992

[51] Int. Cl.⁵ .............................................. B60P 1/48
[52] U.S. Cl. .................................. 414/494; 414/500; 414/546
[58] Field of Search ............... 414/482, 486, 491, 494, 414/500, 506, 538, 546; 298/1 A, 19 V

[56] References Cited

U.S. PATENT DOCUMENTS

| | | | |
|---|---|---|---|
| 3,212,655 | 10/1965 | Pruss | 414/546 X |
| 3,446,534 | 5/1969 | King | 298/12 |
| 3,768,671 | 10/1973 | LaVier | 414/546 X |
| 3,814,271 | 6/1974 | Lööck | 414/491 |
| 3,826,534 | 7/1974 | Ruff | 298/1 |
| 3,915,496 | 10/1975 | Mabry, Jr. | 298/14 |
| 3,944,095 | 3/1976 | Brown | 414/494 X |
| 4,084,851 | 4/1978 | Duncan, Sr. | 298/14 |
| 4,344,731 | 8/1982 | Visa et al. | 414/491 X |
| 4,383,791 | 5/1983 | King | 414/546 X |
| 4,740,132 | 4/1988 | Peyre | 414/494 |
| 5,007,792 | 4/1991 | Wiedeck et al. | 414/494 X |
| 5,163,800 | 11/1992 | Raisio | 414/500 |
| 5,203,668 | 4/1993 | Marmur | 414/494 |

FOREIGN PATENT DOCUMENTS

| | | | |
|---|---|---|---|
| 0085698 | 6/1958 | Denmark | 414/494 |
| 2417415 | 10/1979 | France | 414/494 |
| 0297511 | 3/1971 | U.S.S.R. | 414/494 |
| 1553423 | 3/1990 | U.S.S.R. | 414/494 |

Primary Examiner—Michael S. Huppert
Assistant Examiner—James Keenan
Attorney, Agent, or Firm—Frank J. Dykas; Craig M. Korfanta

[57] ABSTRACT

Various embodiments are shown and described, each of a vehicle crane unit for loading, unloading, and dumping objects from a vehicle and for moving objects that rest on the vehicle or off of the vehicle. The vehicle crane unit includes a vehicle horizontal base and a vertical frame that extends up from the base. A boom pivots on the vehicle and is held in various desired positions by stops that are attached to the vertical frame. The boom has a pulley wheel that can receive a winch-pulled cable that can be attached to an object or a container. By stopping the boom in various positions and taking in, letting out, or repositioning the cable, the vehicle crane unit pulls and lifts the object or container to a desired location. An optional container is designed to rest on and cooperate with the vehicle crane unit, for dumping contents from the container or for on-loading and off-loading the container with its contents.

13 Claims, 13 Drawing Sheets

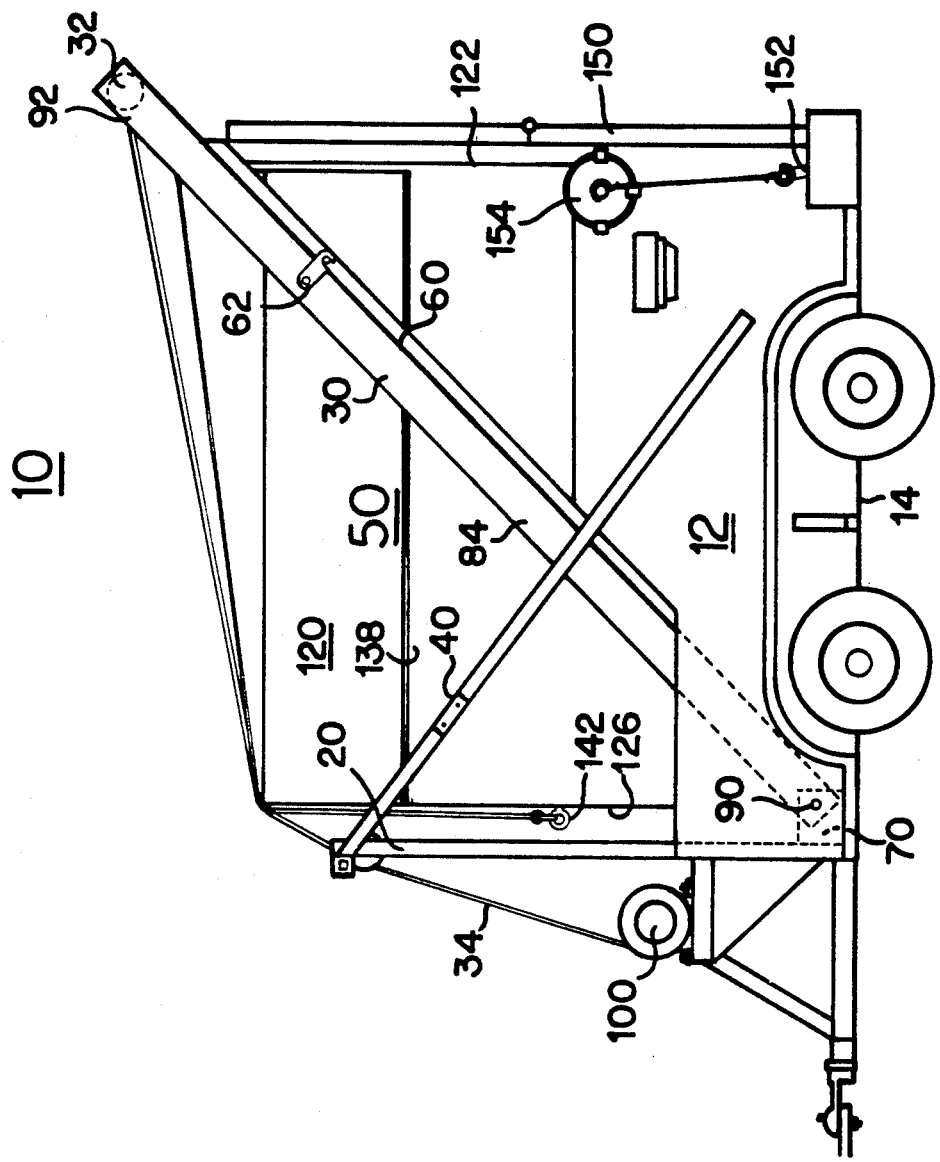

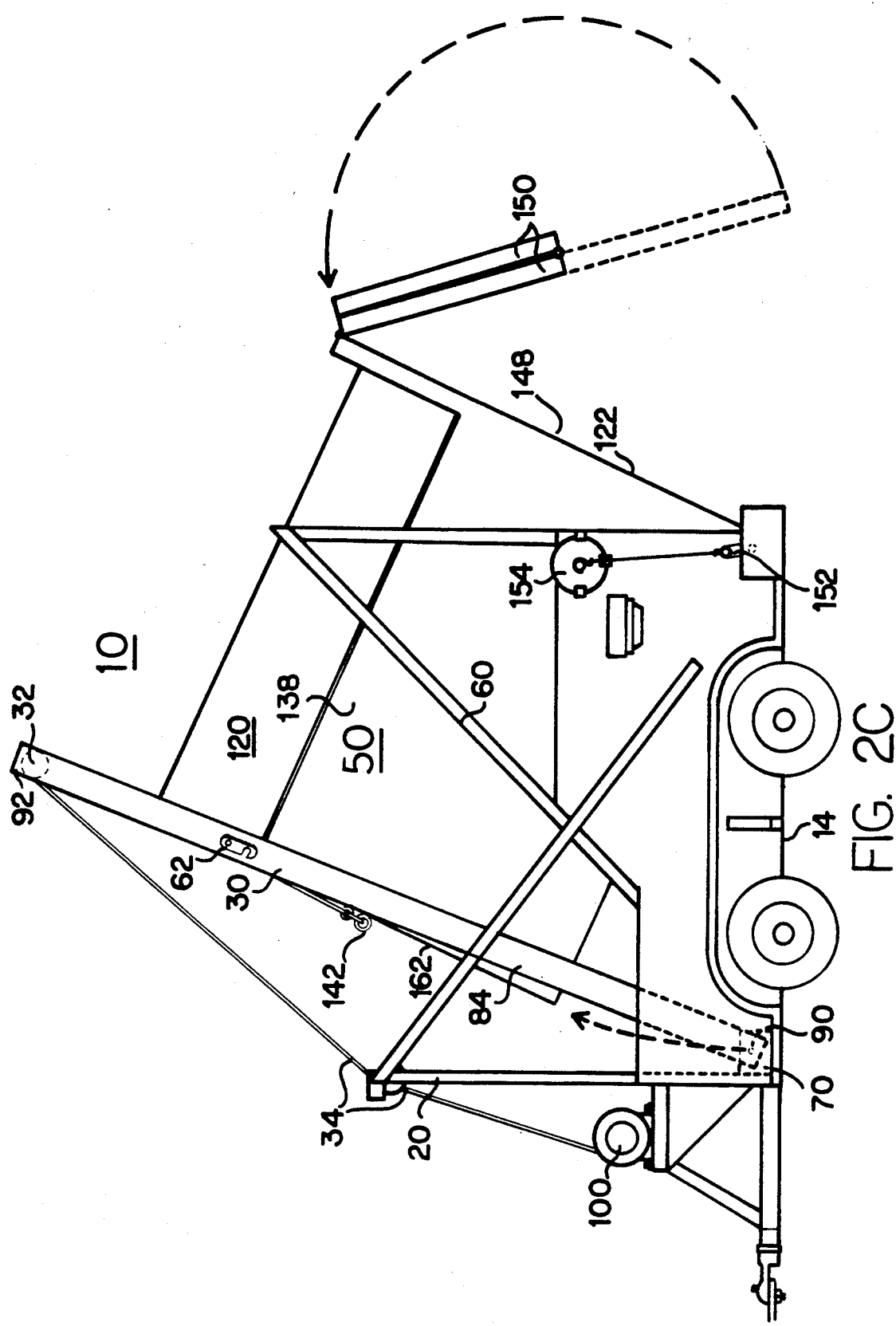

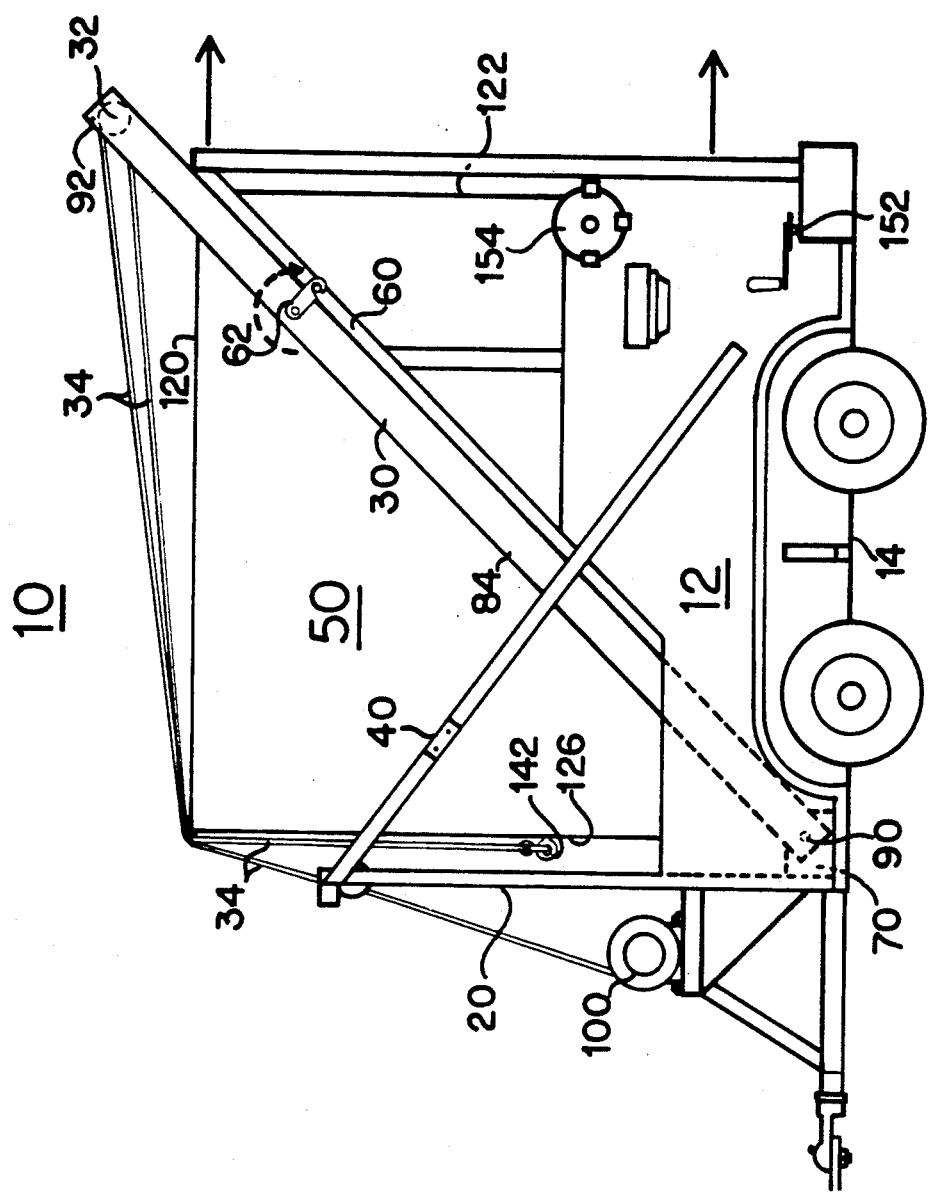

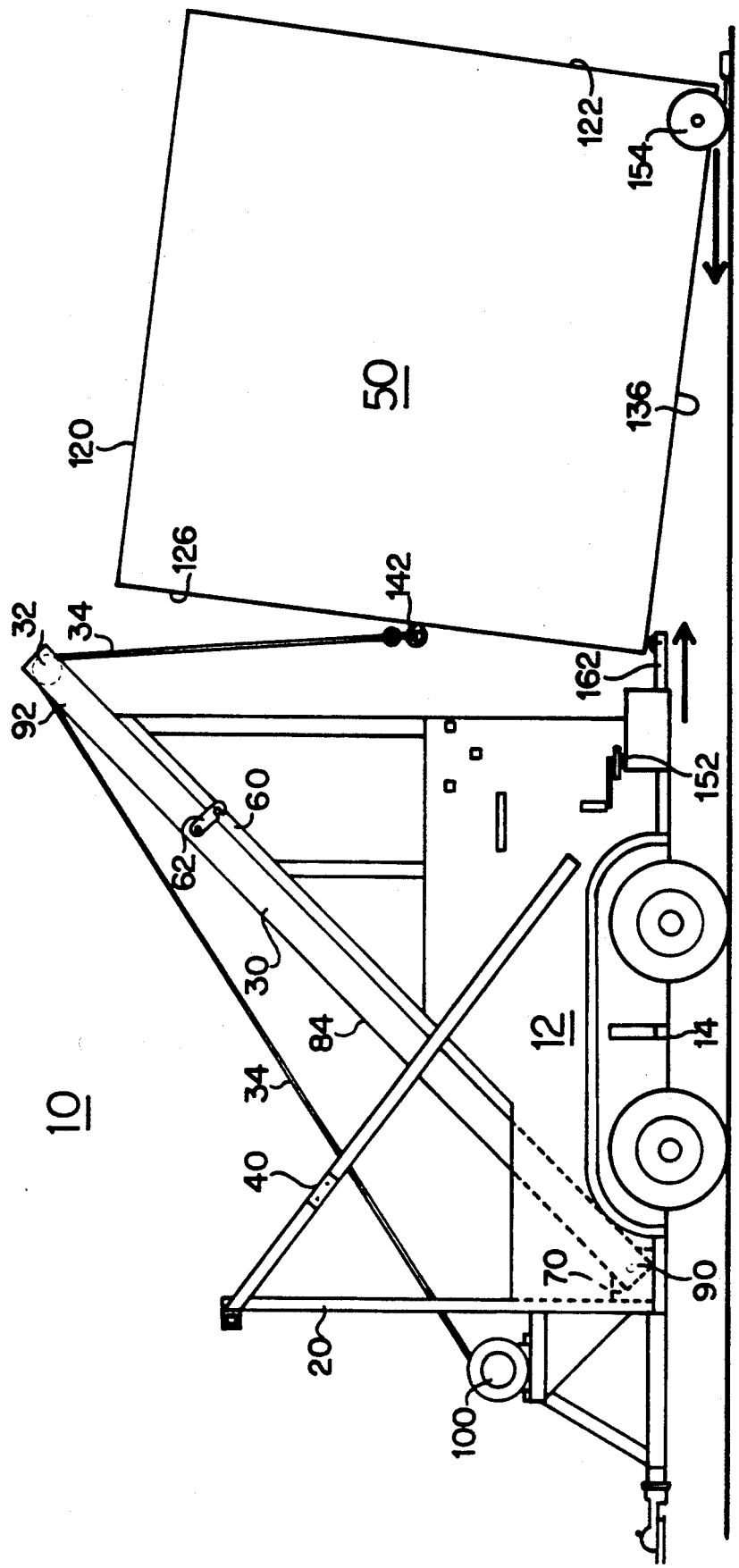

VEHICLE CRANE UNIT

BACKGROUND OF THE INVENTION

1. Technical Field

This invention relates to vehicle-mounted crane and hoist systems for loading and unloading objects from the vehicle and for moving objects. This invention also relates to vehicle-mounted container dump systems for tipping and emptying a container.

2. Background Art

Cranes, hoists, and other mechanical arms have been mounted on vehicles, such as masonry trucks and railroad cars, for lifting material onto and off of the vehicle platforms. Hydraulic pressure cylinders, or cable and pulley systems that extend along the length of the mechanical arms, are often used to change the direction of the arms and the angle of joints between sections of articulated arms.

Truck-mounted container dump systems have been designed with containers that can be tipped to dump material out the back of the container, usually through a hinged door. A typical example is the common dump truck, in which the truck bed acts as the container and hydraulics are typically used to raise and lower the truck bed. Dump containers that are separate from the truck bed have also been designed, especially for use in pickup truck beds. Duncan, Sr. (U.S. Pat. No. 4,084,851) discloses a cargo bin that is tipped back and halfway out of a pickup bed, guided by rollers moving through guideways, by a sudden forward movement of the truck. The contents of the bin are discharged as springs pull the bin back into the pickup bed. King (U.S. Pat. No. 3,446,534) discloses a load bed that rolls down an inclined guideway when the pickup tailgate is opened, catches on hooked portions of the guideway, and then tips down until the back end of the load bed touches the ground. Mabry, Jr. (U.S. Pat. No. 3,915,496) discloses a dumping box that rolls out of the pickup on a support frame, which can be inclined by a jack, and then tips to touch the ground. Ruff (U.S. Pat. No. 3,826,534) discloses a dump body which is tipped by a cable that passes back and forth between stationary front and rear posts that extend up from the pickup bed.

What is still needed is a simple, controllable and easily operated system for both loading, unloading, and dumping a container or other objects from a vehicle.

DISCLOSURE OF INVENTION

This invention is a vehicle crane unit that can be used to load and unload objects from a vehicle and to move objects that rest either on the vehicle or off of the vehicle. The invention comprises a vehicle, including a horizontal base and vertical frame that extends up from the horizontal base, a pivotal boom, and a stop means attached to the vertical frame to stop the boom at a desired position and angle relative to the horizontal base. The boom includes a pulley that can receive a winch-pulled cable that can be attached to the object to be moved. The boom is positioned by methods including force applied manually, force exerted on the boom by taking in the cable, and force of gravity when the cable is let go slack. A stop means is engaged to keep the boom from moving in the undesired direction and the cable is then used to pull the object. The vehicle crane unit can also include a container that, by repositioning of the boom and cable, can be tipped for dumping, pulled off the vehicle, or lifted and pulled onto the vehicle.

This invention can be embodied as a self-contained trailer, or as a system for a truck, railroad car, barge, or other vehicle. The invention is simple to manufacture and can easily be scaled up or down in size to suit many applications, such as a large unit for moving van service or a small unit for ranch and farm chores. This invention can be used with a simple cable and winch system that is inexpensive and easy to maintain. This invention is easy to operate, requires little human strength or training, and features very controllable, predictable, and safe performance even when moving heavy objects.

BRIEF DESCRIPTION OF THE DRAWINGS

FIGS. 2A, 2B and 2C show side views of the embodiment of FIG. 1, going through dump mode steps to tip the container.

FIGS. 3A and 3B show side views of the embodiment of FIG. 1, going through off-loading steps to pull another style of the container off the vehicle.

FIGS. 4A and 4B show side views of the embodiment of FIGS. 3A and 3B, going through on-loading steps to pull the container on to the vehicle.

BEST MODE FOR CARRYING OUT INVENTION

Figure 1:
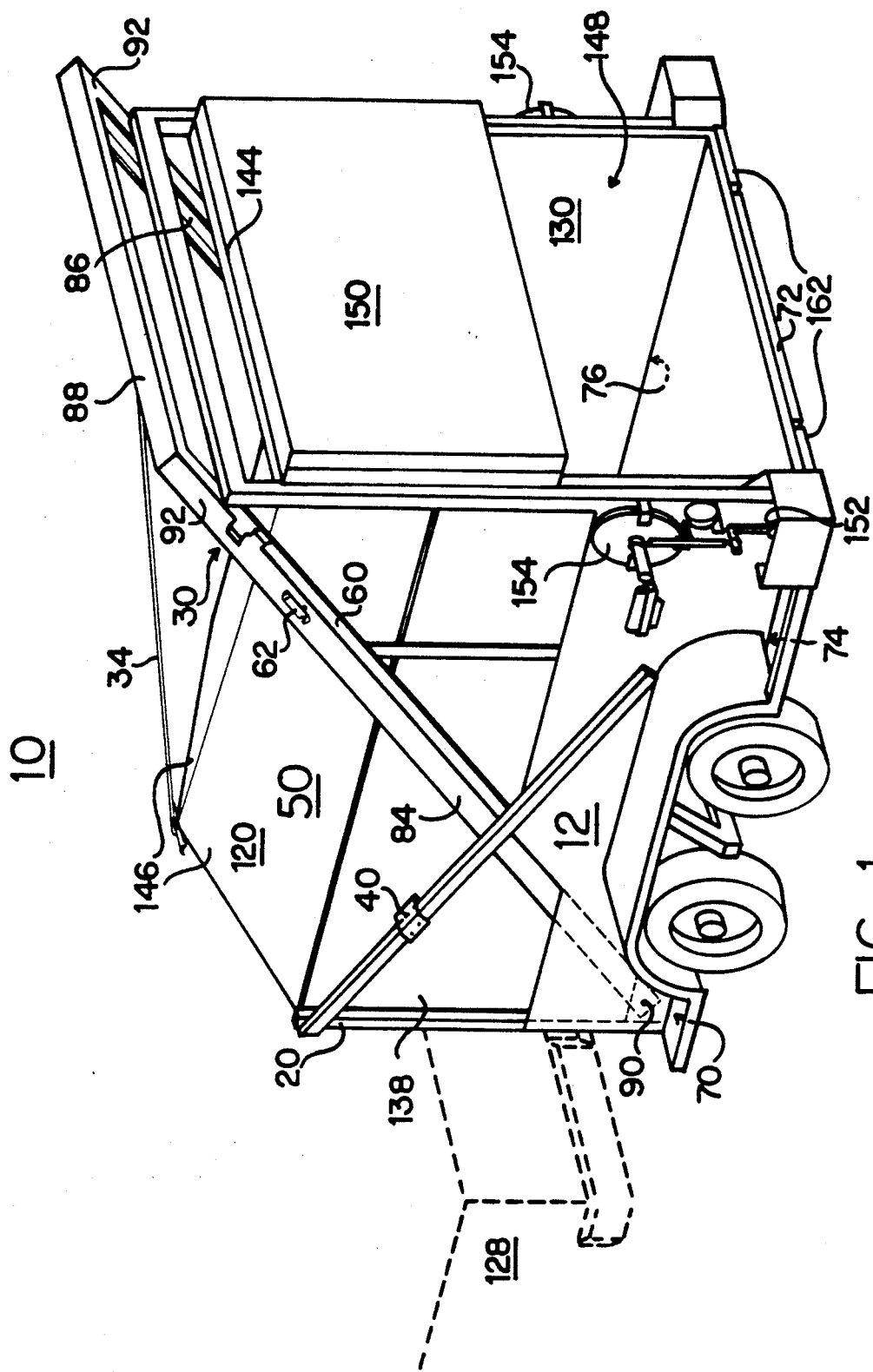
FIG. 1 is a perspective view of one embodiment of the invention with a container, resting on the vehicle, that has top side doors and a dump door halfway open.

Referring to FIGS. 1–10, there are shown some, but not all, of the embodiments of the invented vehicle crane unit 10. The vehicle crane unit 10 comprises a vehicle 12 having a horizontal base 14 and a vertical frame 20 extending up from the horizontal base 14, a pivotable boom 30 that has a pulley wheel 32 for receiving a winch-pulled cable 34, and a stop means 40 for stopping the boom 30 in a desired position.

Figure 4B:
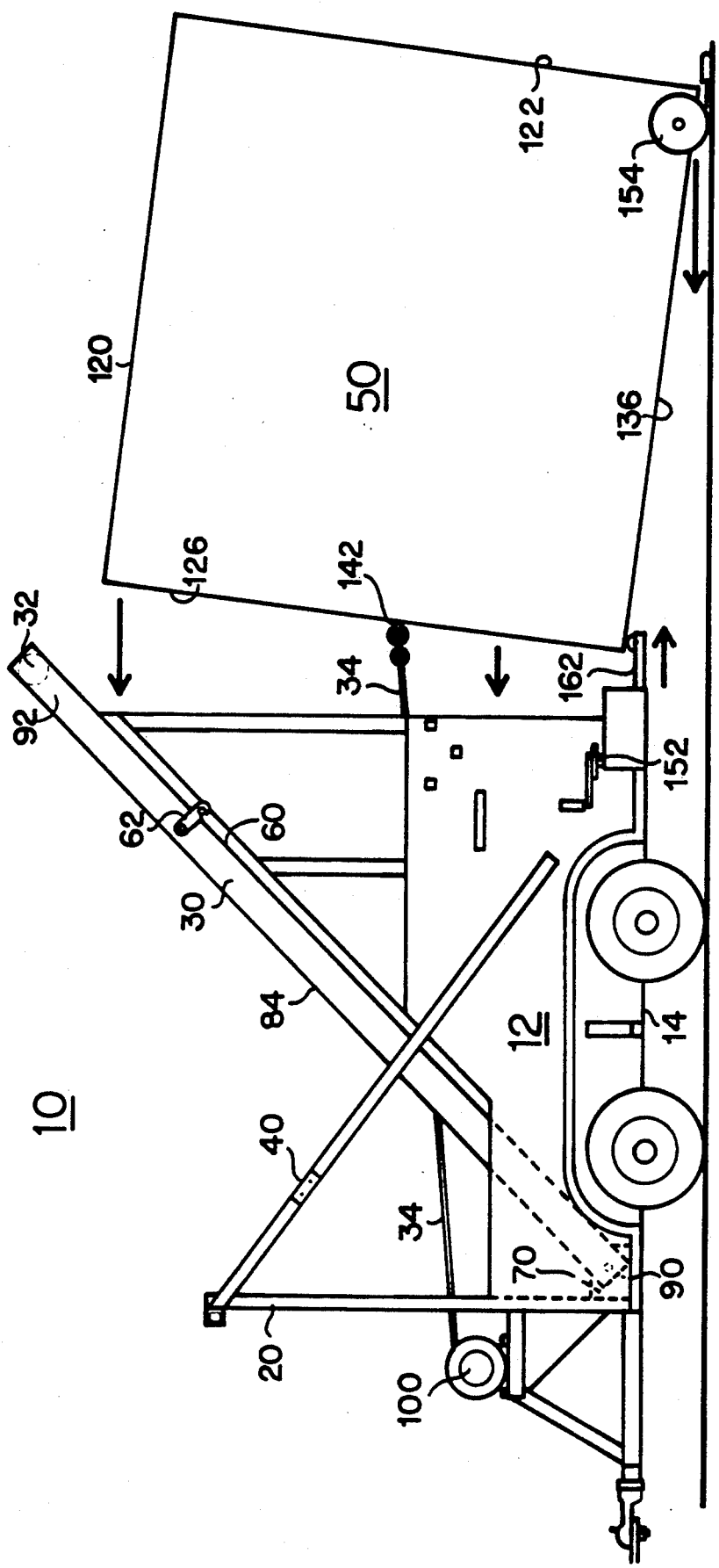
Figure 5:
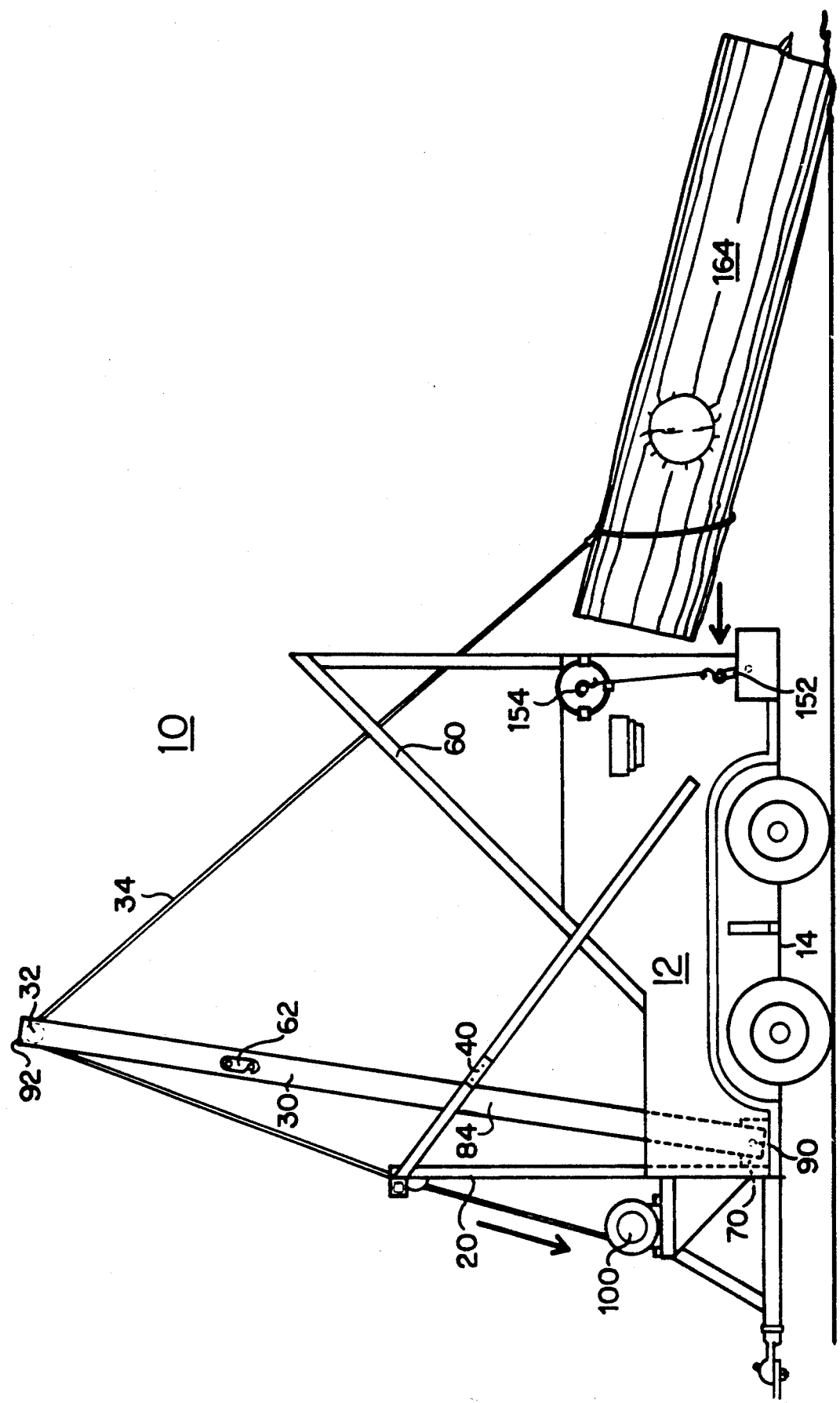
FIG. 5 is a side view of the embodiment of FIG. 1, being used to pull a log onto the vehicle.

As shown in FIGS. 1–4, the best mode, or preferred embodiment, is adapted for use with a container 50 that can be onloaded, offloaded, or tipped for dumping, but the preferred embodiment can be used without the container 50, as shown in FIG. 5. In the preferred embodiment, the vehicle crane unit 10 includes a block means 60 and a lock 62, and the horizontal base 14 has a front edge 70, back edge 72, a first side edge 74 and a second edge 76.

The boom 30 in the preferred embodiment is a rectangular configuration, with a first arm 84 and a second arm 86 and a transverse bar 88 connecting them. The first arm 84 and second arm 86 each have a pivotal end 90 and a cantilevered end 92. The pivotal ends 90 are pivotally attached to the vehicle 12 near the horizontal base 14 so that the boom 30 can swing to place the arms 84 and 86 at various angles relative to the horizontal base 14 and to place the transverse bar 88 at various heights above the horizontal base 14 and various distances from the front edge 70 and back edge 72. The first and second arms 84 and 86 swing in vertical planes close to and parallel to the first and second side edges 74 and 76, respectively. The transverse bar holds a pulley wheel 32 which receives a cable 34 that can be attached at one end to a winch 100 and at the other end to an object or a container 50. As discussed later in this disclosure, the winch 100 and cable 34 are used to apply force to the object or container 50 to pull it onto or off of the vehicle 12, or to tip a container 50 for dumping. As also discussed later, the boom 30 can be moved by force of the winch 100 and cable 34 or by gravity to a desired position and stopped or locked in that position, giving mechanical advantage for pulling the object or container 50.

Figure 7:
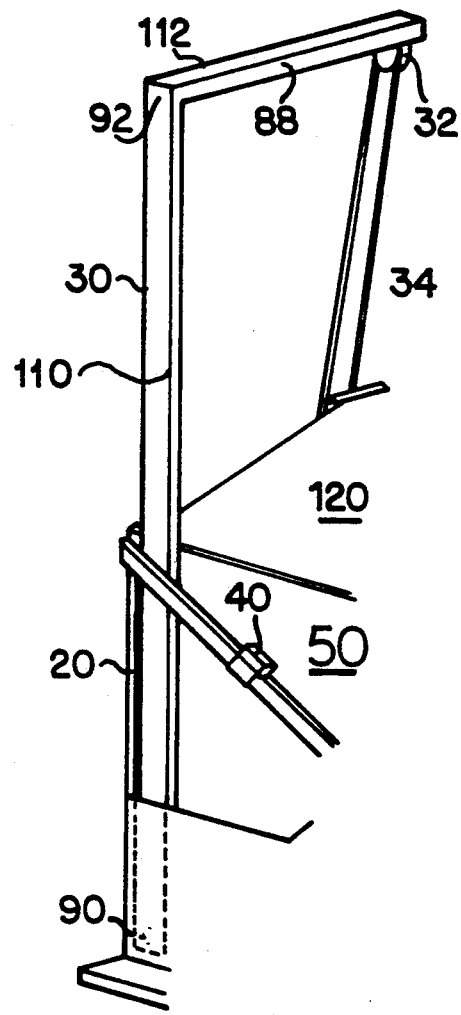
FIG. 7 shows a detail of an alternative embodiment of the boom of the invention.
Figure 8B:
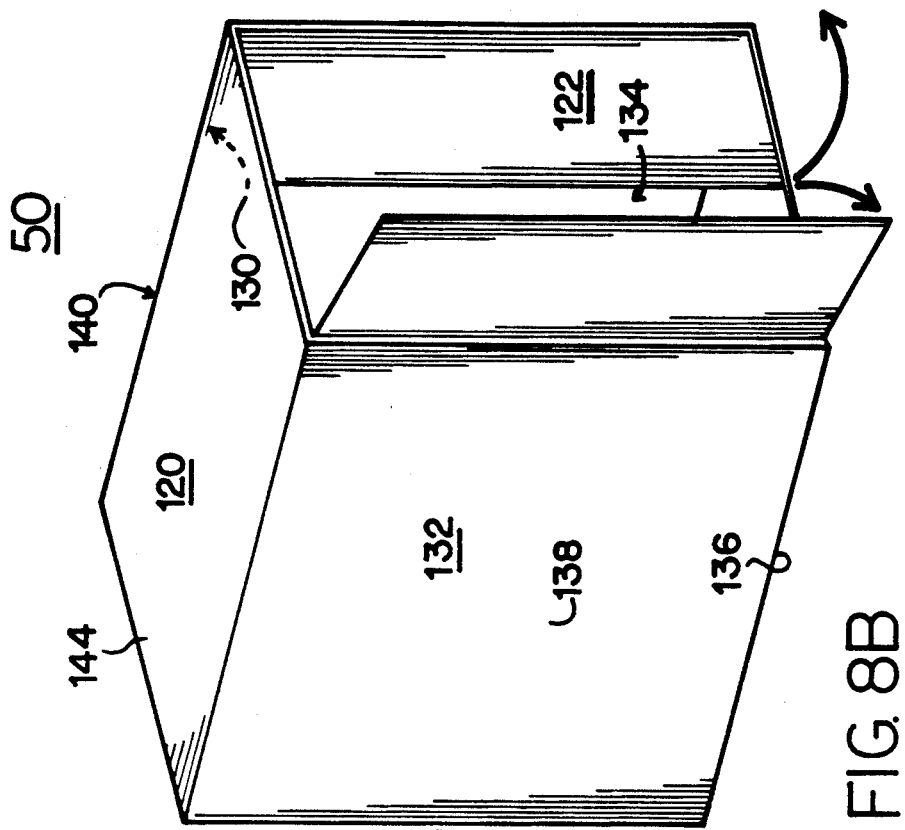
FIGS. 8A and 8B show alternative embodiments of containers: a container with sloping roof doors on the top of the container and a hinged dump door on the back end of the container shown in FIG. 8A and also in FIG. 1, and a container with double doors on the back end of the container shown in FIG. 8B.
Figure 8A:
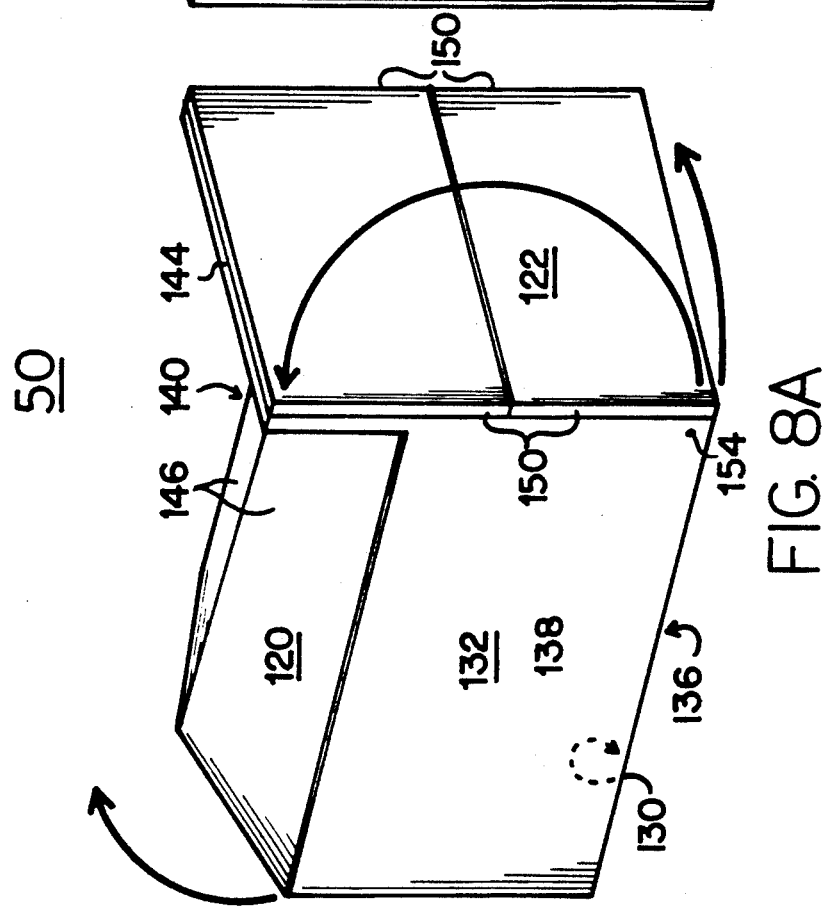

Alternatively, the boom 30 can be designed to have a single arm 110 and an attachment means 112 to connect the pulley wheel 32 to the cantilevered end 92 of the arm. The attachment means 112 is preferably, but not necessarily, a transverse bar 88 as shown in FIG. 7. The transverse bar 88 can be of any length, but there are advantages to the transverse bar 88 being long enough to put the pulley wheel 32 over the center of the horizontal base 14 or over a container 50 or other object that rests on vehicle 12. One advantage is that this keeps the container 50 or object aligned with the center of the horizontal base 14 as it is pulled off of or onto the vehicle 12 so that the object or container 50 is less likely to bind up or be wedged against the vertical frame 20. Another advantage is that the cable 34 can pull the container 50 or object straight up off of the horizontal base 14 instead of sideways and up.

The rectangular boom design shown in FIG. 1 also has the advantage of the transverse bar 88. The pulley wheel 32 is preferably at about the center of the transverse bar 88 which places the pulley wheel 32 over the center of the horizontal base 14. The rectangular boom design also has the advantage of being attached to the vehicle 12 at two points, the pivotal ends 90 of the first and second arm 84 and 86, which adds strength to the boom 30 and reduces the chance of a heavy object torquing the boom 30.

Figure 6C:
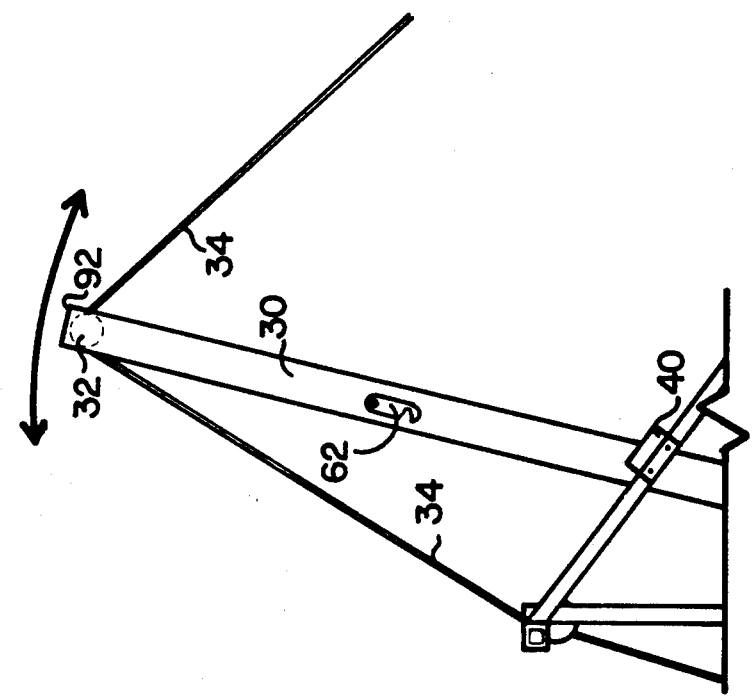
FIGS. 6A, 6B and 6C show details of a stop means, set to keep the boom from swinging to a greater angle relative to the horizontal base of the vehicle in FIG. 6A, set to keep the boom from swinging to a lesser angle in FIG. 6B, and retracted to allow the boom to swing past the stop means in FIG. 6C.
Figure 6B:
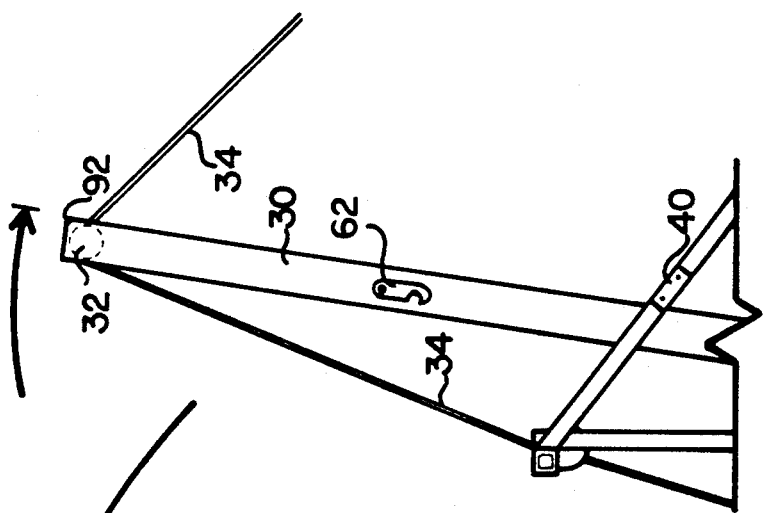
Figure 6A:
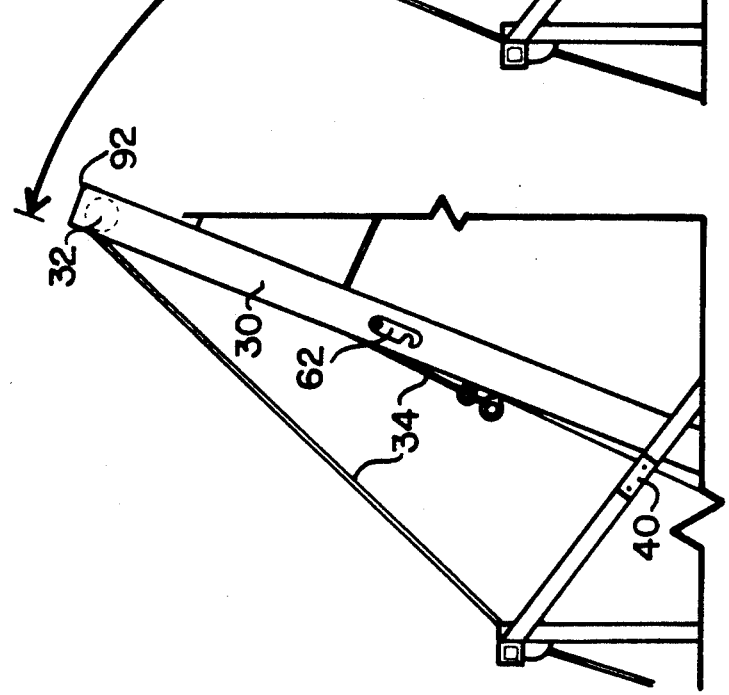

The stop means 40 can be used to produce three results, as shown in FIGS. 6A, 6B and 6C. When set in one position relative to the boom 30 (FIG. 6A), the boom 30 hits up against the stop means 40 and the boom 30 is prevented from swinging to a more elevated position, or, in other words, from swinging to a greater angle relative to the horizontal base 14. When set in a second position (FIG. 6B) the boom 30 hits down against the stop means 40 and the boom 30 is prevented from swinging to a lower position or, in other words, from swinging to a lesser angle relative to the horizontal base 14. When the stop means 40 is retracted to a third, or neutral position (FIG. 6C), the stop means 40 does not interfere with the boom 30 and the boom 30 can swing by the stop means 40. In the preferred embodiment, the stop means 40 is a hinged wing that is attached to the vertical frame 20 and that can be swung to cross into the plane in which swings an arm 84, 86, 110 of the boom. The stop means 40 could be of other designs, for example, a pin that slides in and out from the vertical frame 20 to cross into the arm's plane. Optionally, more than one stop means 40 can be attached at spaced distances along the vertical frame 20. This option allows the boom 30 to be stopped at more than one angle if needed to maneuver an object or container 50.

To engage the stop means 40 as in FIG. 6A, the hinged wing is swung into the arm's plane when the arm 84, 86, 110 is lower than the stop means 40. To engage the stop means 40 as in FIG. 6B, the hinged wing is swung into the arm's plane when the arm is above or, in other words, more elevated than the stop means 40. The stop means 40 provides a force that holds the boom 30 still because it is opposite to the force applied to the boom 30 by the cable 34. Whether the stop means 40 is used to hold the boom 30 down as in FIG. 6A or up, as in FIG. 6B, depends on what is the direction of the force of the cable 34.

The block means 60 of the preferred embodiment adapts the vehicle crane unit 10 for easier use with a container 50. The block means 60 prevents the boom 30 and transverse bar 88 from swinging so low that the transverse bar 88 interferes with a container 50 as it rests on the vehicle 12 or as it is pulled on or off of the vehicle 12. This block means 60 prevents the transverse bar 88 from hitting the top side 120 of the container and from falling in back of the back end 122 of the container to obstruct the movement of the container 50 as it is being pulled onto or off of the vehicle 12. When the boom 30 rests against the block means 60, the boom 30 is said to be in the lowered position. In the preferred embodiment, the block means 60 is a beam, extending from the vehicle 12, against which the boom 30 rests. Alternatively, the block means 60 could be of other designs, for example, it could be designed like the hinged wing stop means described above and could be used similarly to FIG. 6B to prevent the boom 30 from going below the hinged wing.

The lock 62 of the preferred embodiment can be engaged to prevent the boom 30 from swinging up from the lowered position. This lock 62 can be a swinging latch hook that swings to catch on to a post on the boom. Alternatively, the lock 62 could be of other designs. For example, it could be designed like the hinged wing stop means and could be swung into the plane of the arm 84, 86, 110 above the arm when the arm is in the lowered position, similarly to FIG. 6A, to keep the boom 30 from swinging up from the lowered position.

Figure 3B:
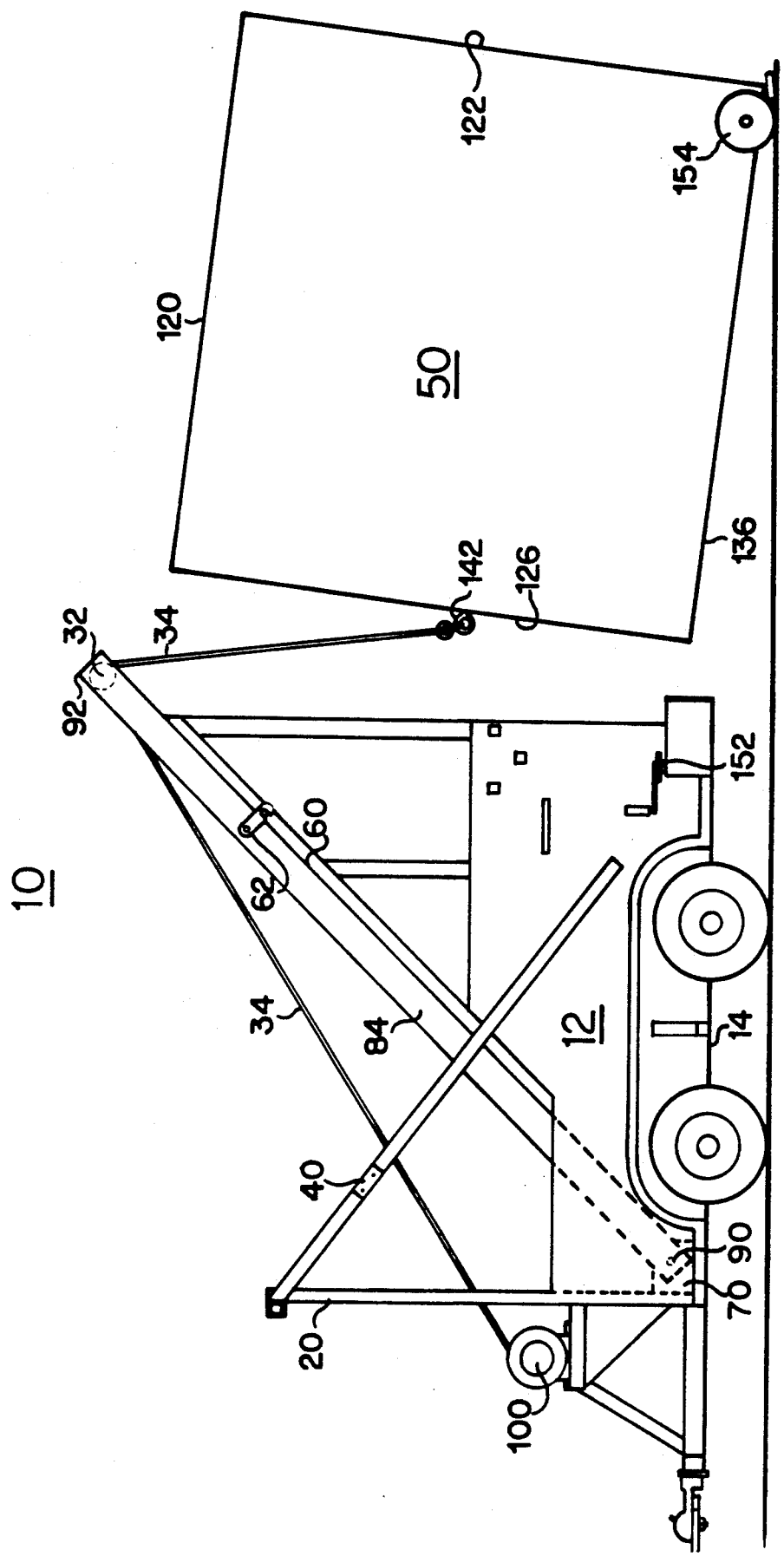

In the preferred embodiment, the boom 30 is sized in length so that, when the boom 30 is in the lowered position, the boom 30 passes through the vertical plane in which lies the back edge 72 of the horizontal base 14, and the transverse bar 88 and pulley wheel 32 lie close to but out past the vertical plane of the back edge 72. As illustrated in FIG. 3B and FIG. 4A and described later in this disclosure, this aids in both the off-loading and on-loading modes of operation. For off loading, the cable 34 can be used to pull an object or the front end 126 of a container all of the way off of the horizontal base 14 without it hanging on the back edge 72. For on-loading, the cable 34 can be used to lift the front end 126 of the container to be close to the back edge 72 but to be in a vertical plane with the transverse bar 88 and pulley wheel 32, this vertical plane being parallel to but further out from the vehicle, or, in other words, out past the vertical plane of the back edge 72 of the horizontal base. In this way, the container front end 126 clears the back edge 72 and does not catch or bind on the back edge 72 when being lifted.

Although the preferred embodiment of the vehicle crane unit 10 is a self-contained trailer pulled by a pickup truck 128, embodiments can include other vehicles such as a pickup truck, a railroad car, or a barge. The boom 30 and stop means 40 can be installed in a pickup truck bed, with the vertical walls of the bed acting as the vertical frame 20 of the vehicle 20 or with a separate vertical frame 20 installed into the bed. The horizontal base 14 of the vehicle can be of various designs, for example, a solid platform or an open frame, and can optionally have rollers or guides to reduce friction for assisting in the on-loading or off-loading of an object or container 50. The winch 100 can be mounted on the trailer or whatever vehicle 12 is used, or mounted separate and remote from the vehicle crane unit 10.

The vehicle crane unit 10 can be used with a container 50. In the preferred embodiment, the vehicle crane unit 10 and container 50 are sized and adapted to work together, as shown in FIGS. 1-4.

The container 50 is defined by an enclosure wall having an interior surface 130, an exterior surface 132, and an opening 134 for insertion and removal of objects into and out of the container 50. The container 50 has a bottom 136, a top side 120, a front end 126, a back end 122, a first side 138 and a second side 140, and an attachment means 142 on the front end 126 for hooking up the cable 34. When the container 50 rests on the vehicle 12, the bottom 136 rests on and cooperates with the horizontal base 14 so that the container is stably supported and can be transported on the vehicle 12. The container 50 fits between the first arm 84 and the second arm 86 of the boom and under the transverse bar 88 and pulley wheel 32. The tallest part of the container, or, in other words, the uppermost extremity 144 of the top side 120 of the container, is of a height that cooperates with the boom 30 and the block means 60 so that the boom 30 does not interfere with or block the movement of the container 50.

The opening 134 in the enclosure wall of the container 50 can be anywhere in the enclosure wall, with a door covering the opening if needed to keep material or objects inside the container until they are to be deliberately dumped or emptied. One embodiment of the container 50, shown in FIGS. 1, 2, and 8A, has the opening 134 located in the top side 120 and has optional, hinged, sloped doors 146 covering the opening 134 for safety and for weatherproofing. This embodiment also has an optional dump opening 148 and a folding dump door 150 in the back end 122 of the container. This dump door 150 is hinged to swing away from the container 50, either while unfolded to its full length or folded in half, for letting material or objects out of the dump opening 148 when the container 50 is tipped as in FIG. 2C. Other embodiments of the container 50 can be used, such as a box-shaped container 50 shown in FIG. 8B. Such a container has many uses because it can be easily be stacked in a warehouse or on a storage lot. This container design is useful for moving and storing household items and furniture, because a person can walk into and carry items all the way to the front end of the container. Preferably, the embodiment in FIG. 8A has an uppermost extremity 144 height that also allows a person to enter the interior of the container 50 for handling of the contents or cleaning of the container.

An optional anchor means 152 is used in some embodiments and modes of operation, such as in FIG. 2C, to anchor the bottom back corner of the container 50 to the vehicle 12 near the back edge 72 of the horizonal base. This helps the container to pivot when the front end 126 is lifted.

Figure 2B:
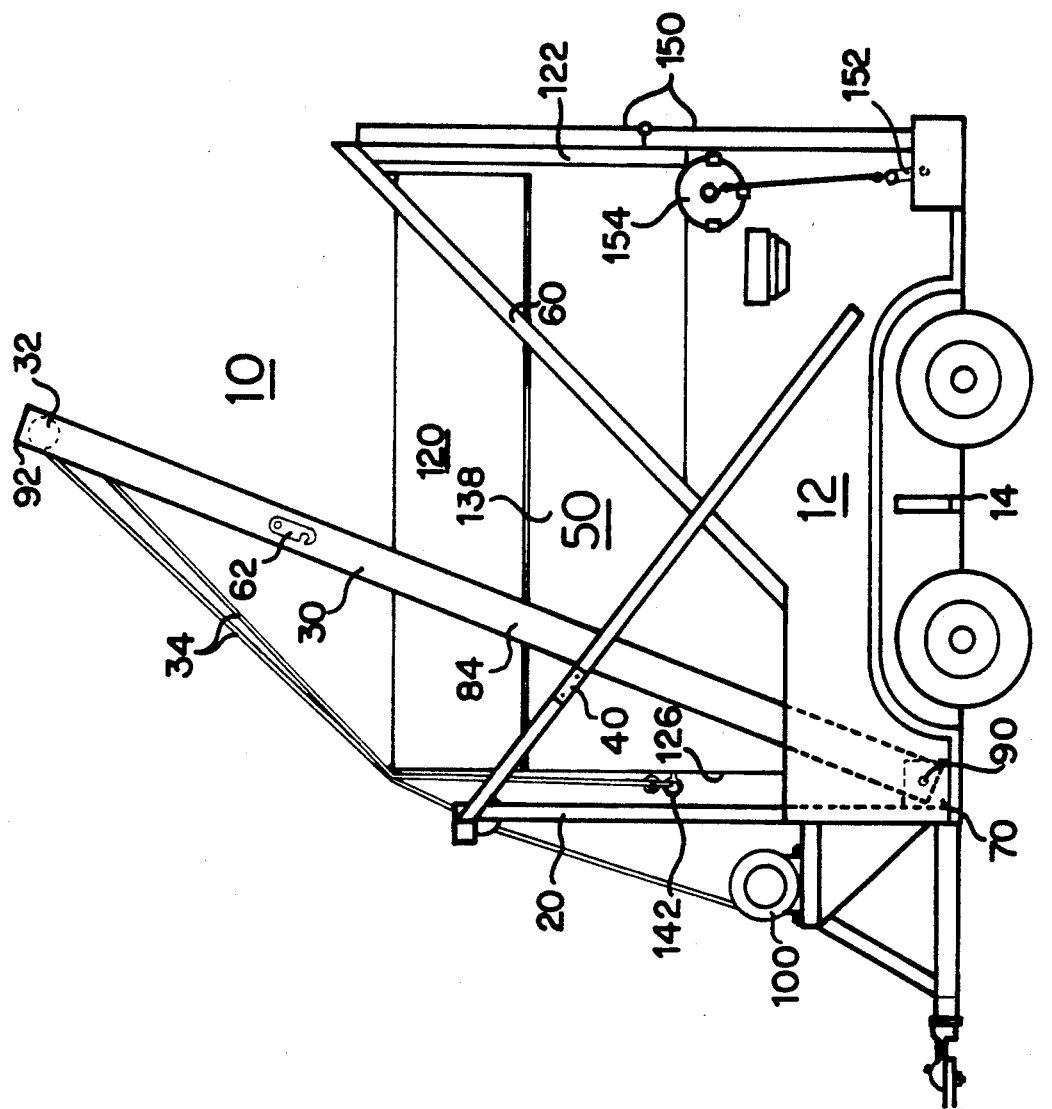

The dumping mode of operation is illustrated in FIGS. 2A, 2B and 2C. In FIG. 2A, the boom 30 is resting in the lowered position and the cable 34 passes through the boom's pulley wheel 32 and is attached to the front end 126 of the container. In FIG. 2B, the cable 34 has been taken in to lift the boom 30 up against the engaged stop means 40 to place the boom 30 in the elevated position. In FIG. 2C, the anchor means 152 is engaged to hold down the bottom back corner of the container 50, and the cable 34 is taken in further to lift the front end 126. Gravity swings open the dump door 150 and dumps out the contents of the container 50. After the contents fall out, the cable 34 is let out to lower the container 50 back on to the horizontal base 14 and then to let the boom 30 swing down by gravity to rest again on the block means 60.

The off-loading mode of operation is illustrated in FIGS. 3A and 3B. In FIG. 3A, the cable 34 passes through the boom pulley wheel 32 and is attached to the container 50, and the lock 62 is engaged to lock the boom 30 in the lowered position. The cable 34 is then taken in and this pulls the container 50 toward the back edge 72 of the horizontal base 14, as shown by the arrows. The cable 34 is taken in until the container 50 is pulled entirely off of the vehicle 12, as shown in FIG. 3B.

Figure 10:
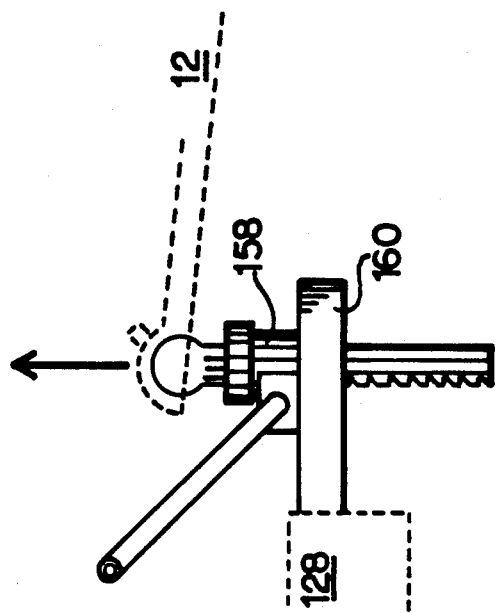
FIG. 10 is a detail view of one embodiment of a tilt means.
Figure 9:
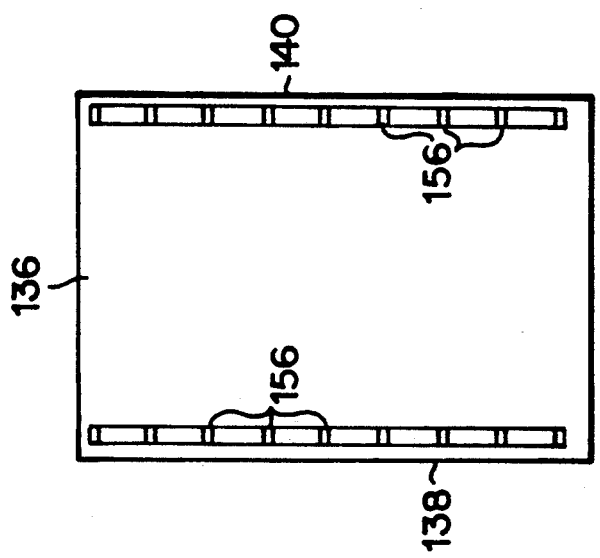
FIG. 9 is a bottom view of one embodiment of a container.

Optionally, detachable wheels 154 can be attached to the container 50 to help the container roll along the ground. Alternatively, the container 50 can include rollers 156 or casters attached to the exterior surface of the container bottom 136, as shown in FIG. 9. When these rollers 156 are included, the container 50 can be detached from the cable 34 and off-loaded from the vehicle 12 just by a person manually pulling or pushing the container. Also, when the container 50 includes these rollers 156, the container 50 can be off-loaded by engaging a tilt means 158 that raises the front edge 70 of the horizontal base 14 relative to the back edge 72 and then by letting the container 50 roll off of the vehicle 12 by gravity, or, with the cable 34 attached to the container 50 but not passing through the pulley wheel 32, by letting out the cable 34. The tilt means 158 can be of various designs, for example, a jack that fits under the horizontal base 14 near the front edge 70, or a hitch ball jack, as shown in FIG. 10, that raises the tongue 160 of the trailer.

The on-loading mode of operation is illustrated in FIGS. 4A and 4B. FIG. 4A shows the cable 34 attached to the front end 126 of the container 50 and taken in to lift the front end 126 up close to the back edge 70 of the horizontal base. Slidable ledges 162 are pulled out to extend part way underneath the container 50, in effect, providing an extension of the horizontal base 14 for the front end 126 of the container to rest on. The cable 34 is then let out enough to lower the container 50 to rest on ledges 162, and the cable 34 is then removed from the boom pulley wheel 32 to place it in the position shown in FIG. 4B. The cable 34 is then taken in to pull the container 50 on to the horizontal base 14 and all the way on to the vehicle 12, as indicated by the arrows in FIG. 4B.

The vehicle crane unit 10 can be used to on-load and off-load various objects and materials, in a similar way as described for the container. FIG. 5 shows an example of the vehicle crane unit 10 being used to load a heavy object 164 onto the vehicle, with the boom 30 raised nearly vertical and held in that position by a stop means 40 while the cable 34 is taken in to pull and lift a log.

The preferred material for construction of the vehicle crane unit 10 and the container 50 is metal or other material that is strong, durable, and does not swell in a moist environment.

The vehicle crane unit 10 and the container 50 can be made any size. A convenient size for small chores and trash dumping is a container 50 that is 4 ft.×4 ft.×8 ft. long, boom arm 110 or arms 84 and 86 that are 10 ft. long, and a 2,000 lb. winch 100.

While there is shown and described the present preferred embodiment of the invention, it is to be distinctly understood that this invention is not limited thereto but may be variously embodied to practice within the scope of the following claims.

I claim:

1. A vehicle crane unit comprising:
   a vehicle comprising a horizontal base, having a front edge and an opposing back edge, and a vertical frame attached to and upstanding from the horizontal base,
   a cable and a winch for lifting and pulling an object,
   a boom for directing the lifting and pulling force supplied by the cable and winch, the boom comprising:
      an arm having a pivot end and an opposing cantilevered end, a pulley wheel, and a transverse bar extending perpendicularly from the cantilevered end of the said arm of the boom for holding the pulley wheel a horizontal distance from the cantilevered end of the arm, the said pulley wheel configured for detachably receiving a cable adapted at one end to attach to the object to be lifted and pulled and at the other end to be taken in and let out by the winch,
      the pivot end of the arm being pivotally attached to the vehicle near the horizontal base for allowing the boom to swing in a vertical plane toward and away from the front and back edges of the horizontal base,
   a stop means, attached to the vertical frame, the stop means being adjustable to one position for contacting the boom and stopping the boom from swinging beyond a preselected angle relative to the horizontal base, adjustable to a second position for contacting the boom and stopping the boom from swinging below a preselected angle relative to the horizontal base, and adjustable to a retracted position for letting the boom swing by the stop means without interference, the stop means being for selecting the position the boom assumes when force is applied to the boom by the taking in or letting out of the cable by the winch,
   a container,
      for being lifted, tipped, and pulled on to and off of the vehicle by changing the position of the boom and by taking in and letting out the cable,
      the container defined by an enclosure wall having an interior surface, an exterior surface, and an opening for insertion and removal of objects into and out of the container,
      the container adapted for placement between the vehicle horizontal base and the transverse bar of the boom, the container having a bottom for resting on and cooperating with the horizontal base, a top side for facing up toward the transverse bar and the top side having an uppermost extremity, a front end for facing toward the front edge of the horizontal base, a back end for facing toward and resting near the back edge of the horizontal base, a first side for facing but not intersecting the vertical plane in which swings the arm of the boom, and opposing second side, and a bottom back corner where the bottom and back end join, and the container having fastening means attached to the front end for connecting the container to the cable,
   a block means attached to the vertical frame for contacting and stopping the boom in a lowered position, with the boom swung toward the back edge of the horizontal base, to block the boom from swinging to an angle that places the transverse bar in contact with the top side of the container and to block the boom from swinging to an angle that places the transverse bar below a height equivalent to the height of the uppermost extremity of the top side for preventing the boom from obstructing the movement of the container as it is pulled onto and off of the vehicle, and
   a lock attached to the block means and extending to detachably connect to the boom when the boom is in the lowered position, for restraining the boom from swinging up from the lowered position,
   and wherein:
   when the boom is in the said lowered position, the boom extends through the vertical plane in which lies the back edge of the horizontal base and the transverse bar and pulley wheel lie in a vertical plane that is parallel, close to, and beyond the vertical plane of the back edge, for allowing the cable to pull the front end of the container to lie in a vertical plane with the transverse bar and pulley wheel without binding on the back edge.

2. A vehicle crane unit as set forth in claim 1, further comprising anchor means for detachably and pivotally connecting the bottom back corner of the container to the vehicle near the back edge of the horizontal base, for allowing the container to pivot around the bottom back corner as the front end of the container is lifted by the cable to tip the container and dump out objects from the container.

3. A vehicle crane unit as set forth in claim 1, wherein the container further comprises a door in the back end for inserting, removing and dumping out objects and for access to the interior surface of the container.

4. A vehicle crane unit as set forth in claim 1, further comprising a ledge slidably attached to the vehicle near the back edge of the horizontal base and adapted to reversibly slide and extend out from the vehicle in horizontal and parallel relationship to the horizontal base, with the ledge extending under and supporting the front end of the container when the container is off of the vehicle and after the front end is lifted up to the back edge of the horizontal base.

5. A vehicle crane unit as set forth in claim 1, further comprising a plurality of rollers connected to the exterior surface of the bottom of the container for contact with the horizontal base when the container is on the vehicle and for contact with the ground when the container is off of the vehicle.

6. A vehicle crane unit as set forth in claim 1, further comprising a tilt means for reversibly tilting the horizontal base so that the back edge is lower than the front edge, for making easier the pulling of the container off of the horizontal base.

7. A vehicle crane unit comprising:
a vehicle comprising a horizontal base, having a front edge and an opposing back edge, a first side edge, and an opposite second side edge, and a vertical frame attached to and upstanding from the horizontal base,
a cable and a winch for lifting and pulling an object,
a boom for directing the lifting and pulling force supplied by the cable and winch, the boom comprising:
a first arm and a second arm each having a pivot end and an opposing cantilevered end, a transverse bar perpendicular to the first and second arms and rigidly connecting the cantilevered ends of the first and second arms, and a pulley wheel attached to the transverse bar,
the said pulley wheel configured for detachably receiving a cable adapted at one end to attach to the object to be lifted and pulled and at the other end to be taken in and let out by the winch,
the pivot end of the first arm being pivotally attached to the vehicle near the first side edge of the horizontal base and the pivot end of the second arm being pivotally attached to the vehicle near the second side edge of the horizontal base, for allowing the boom to swing toward and away from the front and back edges of the horizontal base to selected angles and positions relative to the horizontal base, with the first and second arms swinging in parallel vertical planes,
a container,
for being lifted, tipped, and pulled on to and off of the vehicle by changing the position of the boom and by taking in and letting out the cable,
the container defined by an enclosure wall having an interior surface, an exterior surface, and an opening for insertion and removal of objects into and out of the container,
the container adapted for placement between the vehicle horizontal base and the transverse bar of the boom and between the first and second arms of the boom, the container having a bottom for resting on and cooperating with the horizontal base, a top side for facing up toward the transverse bar and the top side having an uppermost extremity, a front end for facing toward the front edge of the horizontal base, a back end for facing toward and resting near the back edge of the horizontal base, a first side for facing but not intersecting the vertical plane in which swings the first arm of the boom, an opposing second side for facing but not intersecting the vertical plane in which swings the second arm of the boom, and a bottom back corner where the bottom and back end join, and
the container having fastening means attached to the front end for connecting the container to the cable,
stop means, attached to the vertical frame, the stop means being adjustable to one position for contacting the boom and stopping the boom from swinging beyond a preselected angle relative to the horizontal base, adjustable to a second position for contacting the boom and stopping the boom from swinging below a preselected angle relative to the horizontal base, and adjustable to a retracted position for letting the boom swing by the stop means without interference, the stop means being for selecting the position the boom assumes when force is applied to the boom by the taking in or letting out of the cable by the winch,
a block means attached to the vertical frame for contacting and stopping the boom in a lowered position, with the boom swung toward the back edge of the horizontal base, to block the boom from swinging to an angle that places the transverse bar in contact with the top side of the container and to block the boom from swinging to an angle that places the transverse bar below a height equivalent to the height of the upper most extremity of the top side for preventing the boom from obstructing the movement of the container as it is pulled onto and off of the vehicle, and
a lock attached to the block means and extending to detachably connect to the boom when the boom is in the lowered position, for restraining the boom from swinging up from the lowered position,
and wherein:
when the boom is in the said lowered position, the boom extends through the vertical plane in which lies the back edge of the horizontal base and the transverse bar and pulley wheel lie in a vertical plane that is parallel, close to, and beyond the vertical plane of the back edge, for allowing the cable to pull the front end of the container to lie in a vertical plane with the transverse bar and pulley wheel without hitting and binding on the back edge.

8. A vehicle crane unit as set forth in claim 7, further comprising anchor means for detachably and pivotally connecting the bottom back corner of the container to the vehicle near the back edge of the horizontal base, for allowing the container to pivot around the bottom back corner as the front end of the container is lifted by the cable to tip the container and dump out objects from the container.

9. A vehicle crane unit as set forth in claim 7, wherein the container further comprises a door in the back end for inserting, removing, and dumping out objects and for access to the interior surface of the container.

10. A vehicle crane unit as set forth in claim 7, further comprising a ledge slidably attached to the vehicle near the back edge of the horizontal base and adapted to reversibly slide and extend out for the vehicle in horizontal and parallel relationship to the horizontal base, with the ledge extending under and supporting the front end of the container when the container is off of the vehicle and after the front end is lifted up to the back edge of the horizontal base.

11. A vehicle crane unit as set forth in claim 7, further comprising a plurality of rollers connected to the exterior surface of the bottom of the container for contact with the horizontal base when the container is in the vehicle and for contact with the ground when the container is off of the vehicle.

12. A vehicle crane unit as set forth in claim 11, further comprising a tilt means for reversibly tilting the horizontal base so that the back edge is lower than the front edge, for making easier the pulling of the container off of the horizontal base.

13. A vehicle crane unit comprising:

a vehicle comprising a horizontal base, having a front edge and an opposing back edge, and a vertical frame attached to and upstanding from the horizontal base, a cable and a winch for lifting and pulling an object, a boom for directing the lifting and pulling force supplied by the cable and winch, the boom comprising:

an arm having a pivot end and an opposing cantilevered end, a pulley wheel, and a transverse bar extending perpendicularly for the cantilevered end of the said arm of the boom for holding the pulley wheel a horizontal distance from the cantilevered end of the arm, the said pulley wheel configured for detachably receiving a cable adapted at one end to attach to the object to be lifted and pulled and at the other end to be taken in and let out by the winch, the pivot end of the arm being pivotally attached to the vehicle near the horizontal base for allowing the boom to swing in a vertical plane toward and away from the front and back edges of the horizontal base, a container, for being lifted, tipped, and pulled on to and off of the vehicle by changing the position of the boom and by taking in and letting out the cable, the container defined by an enclosure wall having an interior surface, and exterior surface, and an opening for insertion and removal of objects into and out of the container, the container adapted for placement between the vehicle horizontal base and the transverse bar of the boom, the container having a bottom for resting on and cooperating with the horizontal base, a top side for facing up toward the transverse bar and the top side having an uppermost extremity, a front end for facing toward the front edge of the horizontal base, a back end for facing toward and resting near the back edge of the horizontal base, a first side for facing but not intersecting the vertical plane in which swings the arm of the boom, an opposing second side, and a bottom back corner where the bottom and back end join, and the container having fastening means attached to the front end for connecting the container to the cable, a block means attached to the vertical frame for contacting and stopping the boom in a lowered position, with the boom swung toward the back edge of the horizontal base, to block the boom from swinging to an angle that places the transverse bar in contact with the top side of the container and to block the boom from swinging to an angle that places the transverse bar below a height equivalent to the height of the uppermost extremity of the top side for preventing the boom from obstructing the movement of the container as it is pulled onto and off of the vehicle, and a lock attached to the block means and extending to detachably connect to the boom when the boom is in the lowered position, for restraining the boom from swinging up from the lowered position, and wherein:

when the boom is in the said lowered position, the boom extends through the vertical plane in which lies the back edge of the horizontal base and the transverse bar and pulley wheel lie in a vertical plane that is parallel, close to, and beyond the vertical plane of the back edge, for allowing the cable to pull the front end of the container to lie in a vertical plane with the transverse bar and pulley wheel without binding on the back edge.

* * * * *